United States Patent [19]

Albright et al.

[11] Patent Number: 4,955,455
[45] Date of Patent: Sep. 11, 1990

[54] METHOD FOR ASSEMBLING A SKID STEER LOADER

[75] Inventors: Larry E. Albright, Gwinner; Joseph M. Mather; Orlan J. Loraas, both of Lisbon; Carman Lynnes, Leonard, all of N. Dak.

[73] Assignee: Clark Equipment Company, South Bend, Ind.

[21] Appl. No.: 388,298

[22] Filed: Jul. 27, 1989

Related U.S. Application Data

[63] Continuation of Ser. No. 108,128, Oct. 13, 1987, abandoned, which is a continuation-in-part of Ser. No. 87,900, Aug. 21, 1987, Pat. No. 4,815,550.

[51] Int. Cl.$^5$ .............................................. B60K 5/12
[52] U.S. Cl. .................................... 180/291; 180/6.48; 180/312; 29/469
[58] Field of Search ..................... 180/6.48, 68.1, 68.2, 180/68.4, 291, 292, 294, 295, 299, 312; 123/41.49, 41.7; 29/469, 426.1, 428; 296/203, 196–197

[56] References Cited

U.S. PATENT DOCUMENTS

| | | | |
|---|---|---|---|
| 3,645,350 | 2/1972 | Deli et al. | 180/9.2 R |
| 3,895,728 | 7/1975 | Heggen | 414/266 |
| 3,907,053 | 9/1975 | Savage | 180/68.4 X |
| 3,924,702 | 12/1975 | Heggen | 180/6.48 |
| 3,963,131 | 6/1976 | Dimmer | 214/140 |
| 4,055,262 | 10/1977 | Bauer et al. | 414/697 |
| 4,060,261 | 11/1977 | Bauer et al. | 280/756 |
| 4,074,782 | 2/1978 | Bauer | 180/6.48 |
| 4,117,899 | 10/1978 | Sagaser et al. | 180/6.48 |
| 4,117,902 | 10/1978 | Henline et al. | 180/54.1 |
| 4,131,225 | 12/1978 | Bauer et al. | 228/161 |
| 4,405,280 | 9/1983 | Cochran et al. | 414/685 |
| 4,514,007 | 4/1985 | Macht | 180/6.48 X |
| 4,535,868 | 8/1985 | Mather et al. | 180/297 |
| 4,770,427 | 9/1988 | Howell et al. | 180/298 X |
| 4,815,550 | 3/1989 | Mather et al. | 180/68.1 |

FOREIGN PATENT DOCUMENTS 1595392 8/1981 United Kingdom.

Primary Examiner—Richard A. Bertsch
Assistant Examiner—Brian L. Johnson
Attorney, Agent, or Firm—Kinney & Lange

[57] ABSTRACT

The assembly of a skid steer loader includes the fabrication of a lower frame assembly which has a transmission case with side walls and front and back end walls, and an engine mount platform which is welded to and extends from the back end wall. A hydraulic motor is mounted to each side wall of the transmission case. An engine and hydraulic pump are fastened to an engine/pump mounting bracket and coupled by a belt linkage to form an engine and hydraulic pump assembly. The engine and hydraulic pump assembly is then mounted to the engine mount platform at the back end of the lower frame assembly. Hydraulic fluid hoses which couple the hydraulic pump to the hydraulic motors can then be added. A main frame assembly having a pair of laterally spaced side members adapted to be mounted to the lower frame assembly and form side walls of an engine compartment is also fabricated. A hydraulic control valve and its associated hydraulic fluid hoses can be mounted to the main frame assembly. The main frame assembly is bolted to the lower frame assembly after the engine and hydraulic pump assembly have been fastened to the engine mount platform.

18 Claims, 11 Drawing Sheets

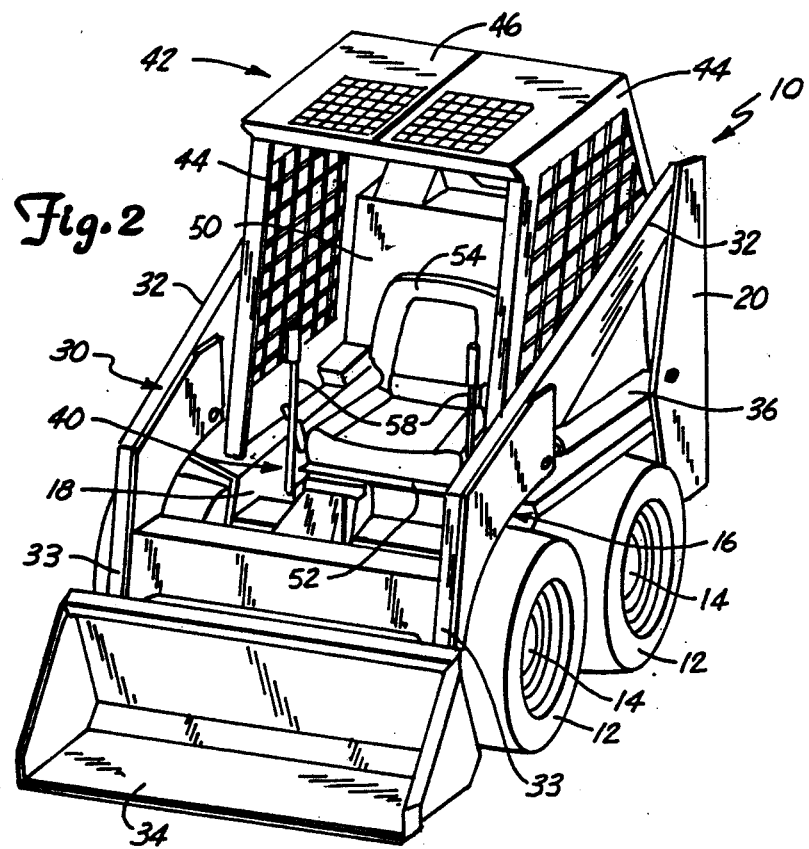

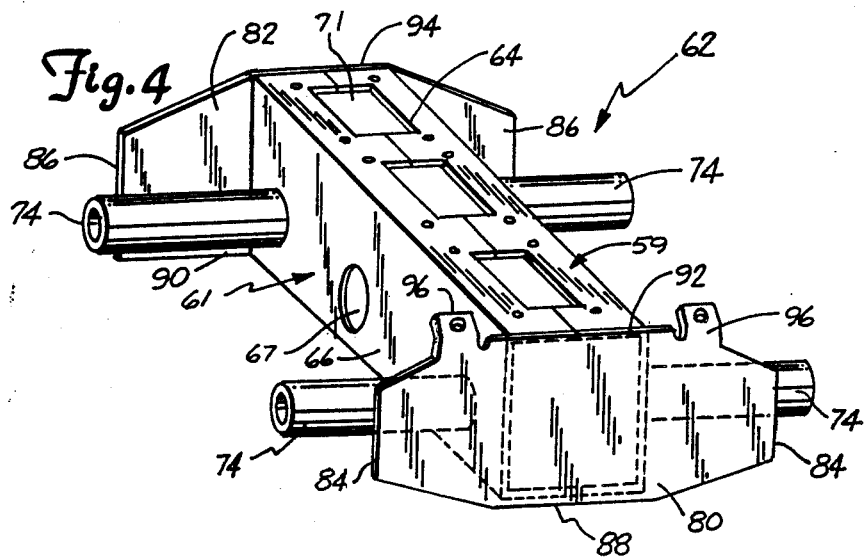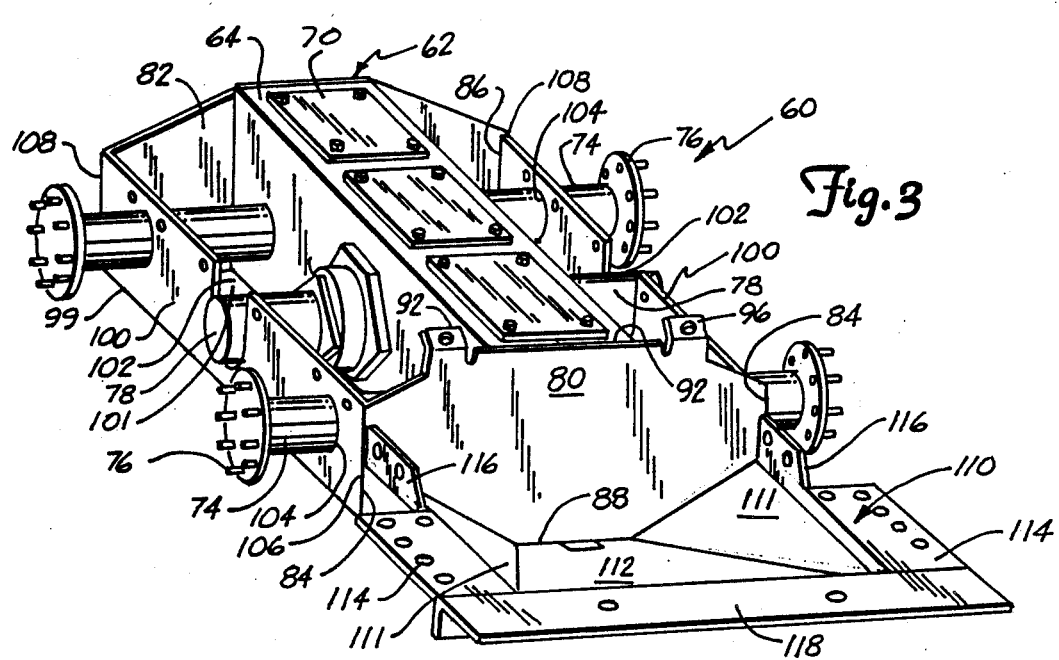

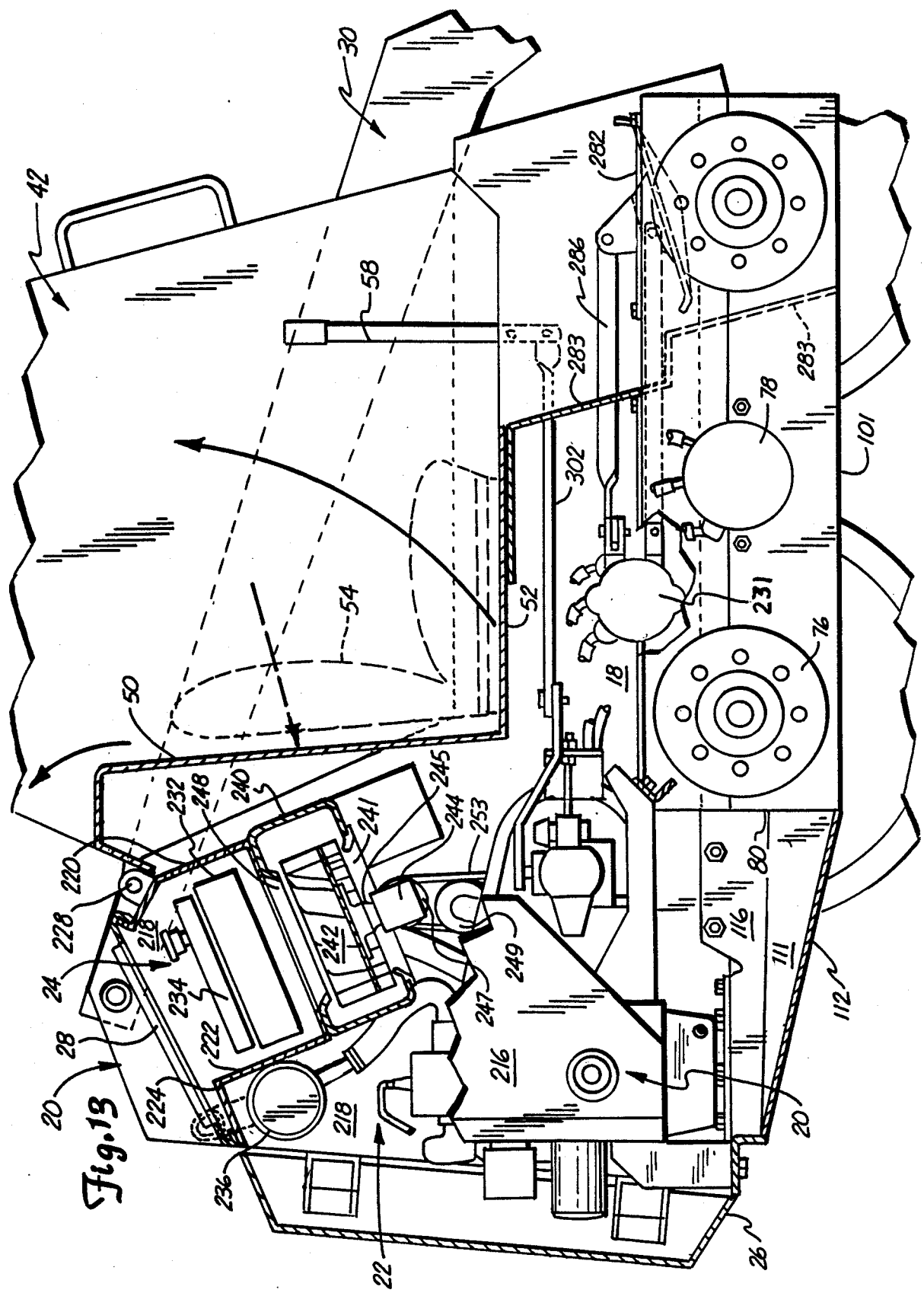

METHOD FOR ASSEMBLING A SKID STEER LOADER

This is a continuation of application Ser. No. 108,128, filed Oct. 13, 1987 (now abandoned) which is a continuation-in-part of U.S. application Ser. No. 87,900, filed Aug. 21, 1987 and now issued as U.S. Pat. No. 4,815,550 on Mar. 28, 1989.

BACKGROUND OF THE INVENTION

1. Field of the Invention

The present invention relates generally to skid steer loaders and their assembly.

2. Description of the Prior Art

Skid steer loaders are compact, highly maneuverable vehicles which are widely used in a variety of applications. Various techniques for manufacturing vehicles of this type are known and disclosed generally in the following United States patents, all of which are assigned to the same assignee as that of the present invention.

Heggen: U.S. Pat. No. 3,895,728
Heggen: U.S. Pat. No. 3,924,702
Bauer et al.: U.S. Pat. No. 4,055,262
Bauer et al.: U.S. Pat. No. 4,060,261
Henline et al.: U.S. Pat. No. 4,117,902
Bauer et al.: U.S. Pat. No. 4,131,225
Mather et al.: U.S. Pat. No. 4,535,868.

In general, known assembly methods begin with the fabrication and assembly of a subframe or transmission case, as disclosed for example in the Bauer et al. U.S. Pat. No. 4,131,225. The transmission case has a pair of axle housings, with axle shafts fit therein, welded to both sides. A hydraulic motor is mounted to each side of the transmission case between the axles. Gear and chain linkages within the transmission case couple each hydraulic motor to the axles on the side of the tranmission case to which it is mounted. Lateral flanges which function as floor plates are mounted to the front and rear axle housings.

Assembly continues by mounting a loader body or main frame such as that fabricated in accordance with the Bauer et al. U.S. Pat. No. 4,060,251 to gusset plates on the transmission case. The main frame includes a pair of longitudinally extending, laterally spaced side beams which are joined at the front by a wall member and at the rear by an upright fabrication which includes a bottom cross member. The upright fabrication includes a pair of uprights, one on each side thereof. A front cross member and a top cross member extend between the uprights at the front and top thereof. A rear cross plate extends between lower edges of the uprights. The uprights, front and top cross members, and rear cross plate partially define the engine enclosure.

The Mather U.S. Pat. No. 4,535,868 discloses a transverse engine mounting in which an engine and hydraulic pump mechanism are mounted to a bracket to form a subassembly. This subassembly is then installed in the engine compartment of the loader, on the rear cross plate. A radiator and oil cooler are mounted to the main frame in one of several known manners, and interconnected to the engine and hydraulics system. Connections between the hydraulic pump and hydraulic motors can also be made.

Following the above procedures, control mechanisms are mounted within the operator's compartment and interconnected to the hydraulic system. The operator's seat is added, and an overhead guard is mounted to the vehicle to enclose the operator's compartment. A boom assembly and bucket are mounted to the main frame. Assembly is then completed by adding wheels to the vehicle.

Skid-steer loaders fabricated and assembled in accordance with the above described method have proven to be rugged and reliable. Certain aspects of the assembly, however, are somewhat difficult. The loader is designed so as to be as compact as possible. As a result, space within the engine compartment is tight. It is therefore difficult to mount the radiator, oil cooler, engine and hydraulic pump within the vehicle. Hydraulic and mechanical interconnections between the engine and pump assembly, oil cooler, radiator, hydraulic motors, and other mechanical and hydraulic systems, as well as required adjustments, are difficult to make due to the limited amount of space in which to work. Difficult assembly procedures such as those discussed above increase the necessary assembly time of the loader.

However, the competitive marketplace places continuing demands for high quality loaders. It is evident that there is a continuing need for improved methods for assembling skid-steer loaders. Improvements which reduce assembly time and thereby increase efficiency are always desired. Structural integrity and durability of the vehicle must of course not be compromised.

SUMMARY OF THE INVENTION

The present invention is an improved method for assembling skid steer loaders. Assembly begins by fabricating a lower frame assembly and a main frame assembly, and providing an engine. The lower frame assembly includes a front end, and a back end having an integral engine mounting structure. The engine is then mounted to the engine mounting structure at the back end of the lower frame assembly. The main frame assembly is mounted to the lower frame assembly after the engine has been mounted to the engine mounting structure.

In preferred embodiments, a hydraulic pump and a linkage for coupling the hydraulic pump to the engine are also provided. The hydraulic pump is mounted to the engine mounting structure at the back end of the lower frame assembly, and coupled to the engine with the linkage, before the main frame assembly is mounted to the lower frame assembly. In still other embodiments, the engine and hydraulic pump are mounted to an engine/pump mounting bracket to form an engine and hydraulic pump assembly. The engine and hydraulic pump assembly is then mounted to the engine mounting structure before the main frame assembly is mounted to the lower frame assembly. A hydraulic control valve and associated hydraulic fluid hoses can also be mounted to the main frame assembly before it is bolted to the lower frame assembly.

The lower frame assembly can be fabricated around a transmission case which has front and back walls and a pair of side walls. The engine mounting structure, which has been separately fabricated, is then welded to the back wall of the transmission case before the engine and hydraulic pump are mounted thereto.

Skid steer loaders can be quickly and efficiently assembled using the method of assembly of the present invention. The engine and hydraulic pump assembly can be attached to the lower frame assembly and tuned without interference from the main frame. Hose interconnections between the hydraulic pump and hydraulic motors can also be easily made at this time. Similarly, the radiator, oil cooler, hydraulic valves and other components can be fastened to the main frame without interference from the lower frame assembly. Durable and compact loaders can thereby be efficiently manufactured.

BRIEF DESCRIPTION OF THE DRAWINGS

FIG. 2 is a perspective view of the skid steer loader shown in FIG. 1, illustrating the front and side.

FIG. 3 is a perspective view, taken from the rear, of a lower frame utilized in the skid steer loader shown in FIG. 1.

FIG. 4 is a perspective view of a chain case which forms a portion of the lower frame shown in FIG. 3.

FIG. 13 is a side view of a portion of the loader, with portions cut away.

DETAILED DESCRIPTION OF THE PREFERRED EMBODIMENTS

Figure 1:
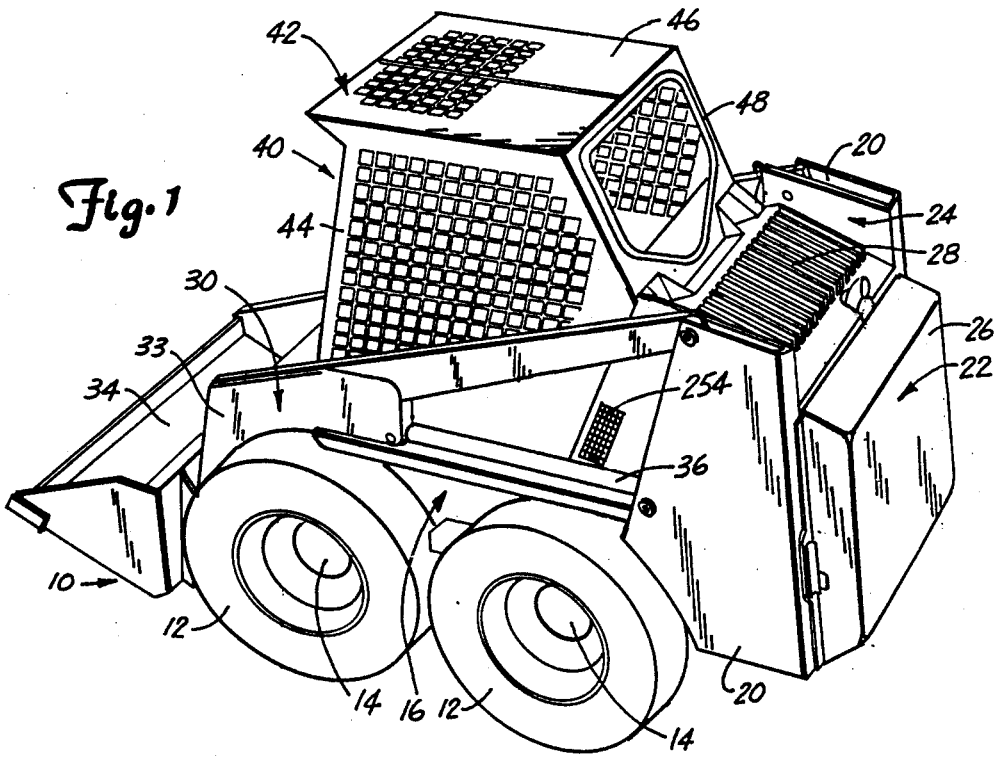
FIG. 1 is a perspective view illustrating the rear and one side of a skid steer loader in accordance with the present invention.

A skid steer loader 10 in accordance with the present invention is illustrated generally in FIGS. 1 and 2. As shown, loader 10, includes a main frame assembly 16, lift arm assembly 30 and operator's compartment 40. An engine compartment 22 and heat exchanger compartment 24 are located at the rear of the vehicle. A pair of wheels 12 which are mounted to stub axles 14 extend from both sides of main frame 16.

Lift arm assembly 30 is mounted to upright members 20 of main frame assembly 16. As shown, lift arm assembly 30 includes an upper portion formed by a pair of lift arms 32 which overlie wheels 12 and are pivotally mounted at a rearward end to upright members 20, and a lower portion 33. Pivotally mounted to lower portion 33 is an attachment such as bucket 34. Lift arm assembly 30 is raised and lowered with respect to main frame 16 by means of a pair of boom lift cylinders 36, each of which has a first end pivotally mounted to one of upright members 20, and a second end pivotally mounted to one of lift arms 32. Bucket 34 is rotated with respect to lift arms 32 in a known manner by means of a bucket tilt cylinder (not visible).

Operator's compartment 40 is partially enclosed by a cab 42 which is defined by side guard panels 44, overhead panel 46, rear guard panel 48, back panel 50 and seat pan 52. Cab 42 is an integral unit which is pivotally mounted at its rear to main frame 16. Cab 42, including seat 54 which is mounted to pan 52, can thereby be rotated upwardly and toward the rear of loader 10 to permit access to engine compartment 22 and other mechanical and hydraulic systems yet to be described.

All functions of loader 10 can be controlled by an operator from within operator's compartment 40. The hydraulic drive system described in subsequent portions of this specification is actuated and vehicle 10 steered using a pair of levers 58, one on each side of seat 54, which can be moved independently in a forward and rearward direction. Motion of levers 58 causes wheels 12 on that side of the loader to rotate at a speed and in a direction corresponding to the extent and direction in which the respective lever is moved. Boom lift cylinder 36 and the bucket tilt cylinder are actuated by means of foot pedals (FIG. 15) mounted toward the front of operator's compartment 40. The general operation of skid steer loaders such as that illustrated and described above is well known.

The assembly of loader 10 begins with the fabrication of a lower frame assembly 60 which is illustrated generally in FIG. 3. Lower frame assembly 60 is fabricated around a transmission case 62 which can be of a conventional design, such as that described in the Bauer et al. U.S. Pat. No. 4,060,261. As perhaps best shown in FIG. 4, transmission case 62 is constructed from two elongated sections 59 and 61 which are welded together to form a top wall 64, side walls 66, (only one of which is visible), and bottom wall (not visible). Top wall 64 includes three openings 71 through which access to mechanical systems within transmission case 62 can be gained. Side walls 66 each include a motor opening 67. A pair of axle housings 74 are welded to and extend from each side wall 66 of transmission case 62.

A back lower frame end flange 80 encloses one end of transmission case 62, and a front lower frame end flange 82 encloses the opposite end. End flanges 80 and 82 will have been previously fabricated from metal, and can be welded to the ends of transmission case 62. In the embodiment shown, end flanges 80 and 82 extend from the sides of transmission case 62 and are generally parallel to axle housings 74. Back end flange 80 has a pair of opposite side edges 84 which are vertically oriented and parallel to transmission case side walls 66, a bottom edge 88 and top edge 92. A pair of integral mounting brackets 96 extend upward from opposite sides of top edge 92 of back end flange 80. Front end flange 82 also has a pair of opposite side edges 86, top edge 94 and bottom edge 90.

Referring back to FIG. 3, lower frame assembly 60 is shown to include a pair of side flanges 100 which are fabricated from metal and have a motor aperture 102 and a pair of axle housing apertures 104. Side flanges 100 are mounted to lower frame assembly 60 with axle housings 74 extending through apertures 104. Opposite edges 106 and 108 of side flanges 100 fit adjacent and are welded to edges 84 and 86 of end flanges 80 and 82, respectively. Flanges 100 are preferably welded to axle housings 74 as well. Bottom panels 101 (only one is visible in FIG. 3) extend between and are welded to back end flange bottom edge 88, front end flange bottom edge 90, side flange lower edges 99, and the lower edges of transmission case side walls 66. The bottom of lower frame 60 is thereby enclosed by bottom panels 101.

Figure 16:
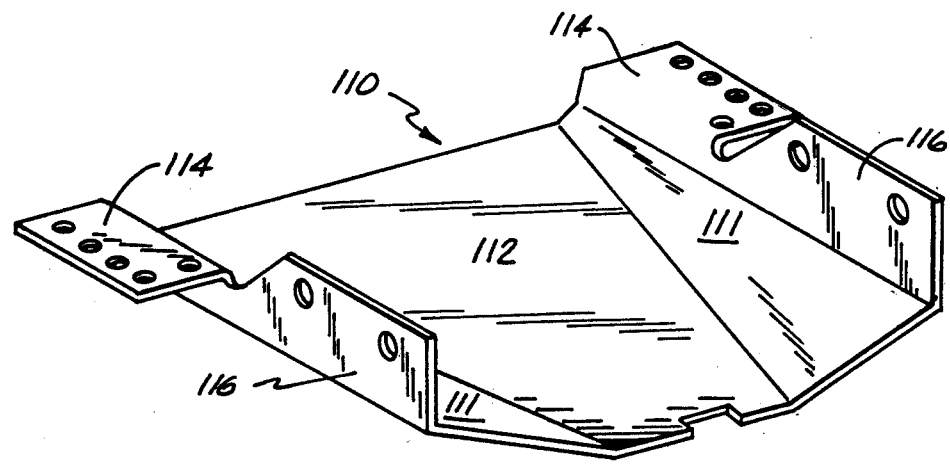
FIG. 16 is a detailed perspective view, taken from the front, of the engine mount assembly shown in FIG. 3.

Lower frame assembly 60 also includes an engine mount platform or assembly 110 which is mounted to back end flange 80 opposite transmission case 62. Engine mount assembly 110 can be fabricated from a single sheet of metal, and is illustrated in greater detail in FIG. 16. As shown, engine mount assembly 110 is fabricated to include a center belly pan panel 112, side belly pan panels 111, and vertically oriented side flanges 116. A pair of integral mounting flanges 114 extend laterally from a rear of side flanges 116. Side flanges 116 and mounting flanges 114 have holes therein to facilitate the mounting of main frame assembly 16. Engine mount assembly 110 is an integral element of lower frame assembly 60, being mounted to transmission case 62 by welding forward edges of panels 111, 112 and flanges 116 to back end flange 80 as shown in FIG. 3. A rear mounting bracket 118 is oriented in a laterally extending direction and welded to a rear edge of panels 111, 112 and flanges 114, at the rear of engine mount assembly 110.

The assembly of lower frame assembly 60 is completed by mounting a hydraulic motor 78, which in some embodiments also includes a gear reduction mechanism, to each side wall 66 adjacent motor openings 67. An axle shaft (not visible) with a wheel mount 76 on one end thereof is rotatably fit within each axle housing 74. Hydraulic motors 78 are coupled within transmission case 62 to the axles on the side of the transmission case to which it is mounted by means of a sprocket and chain linkage (not visible) in a well known manner. Cover plates 70 are then secured to top wall 64 of transmission case 62, covering openings 71.

Figure 5:
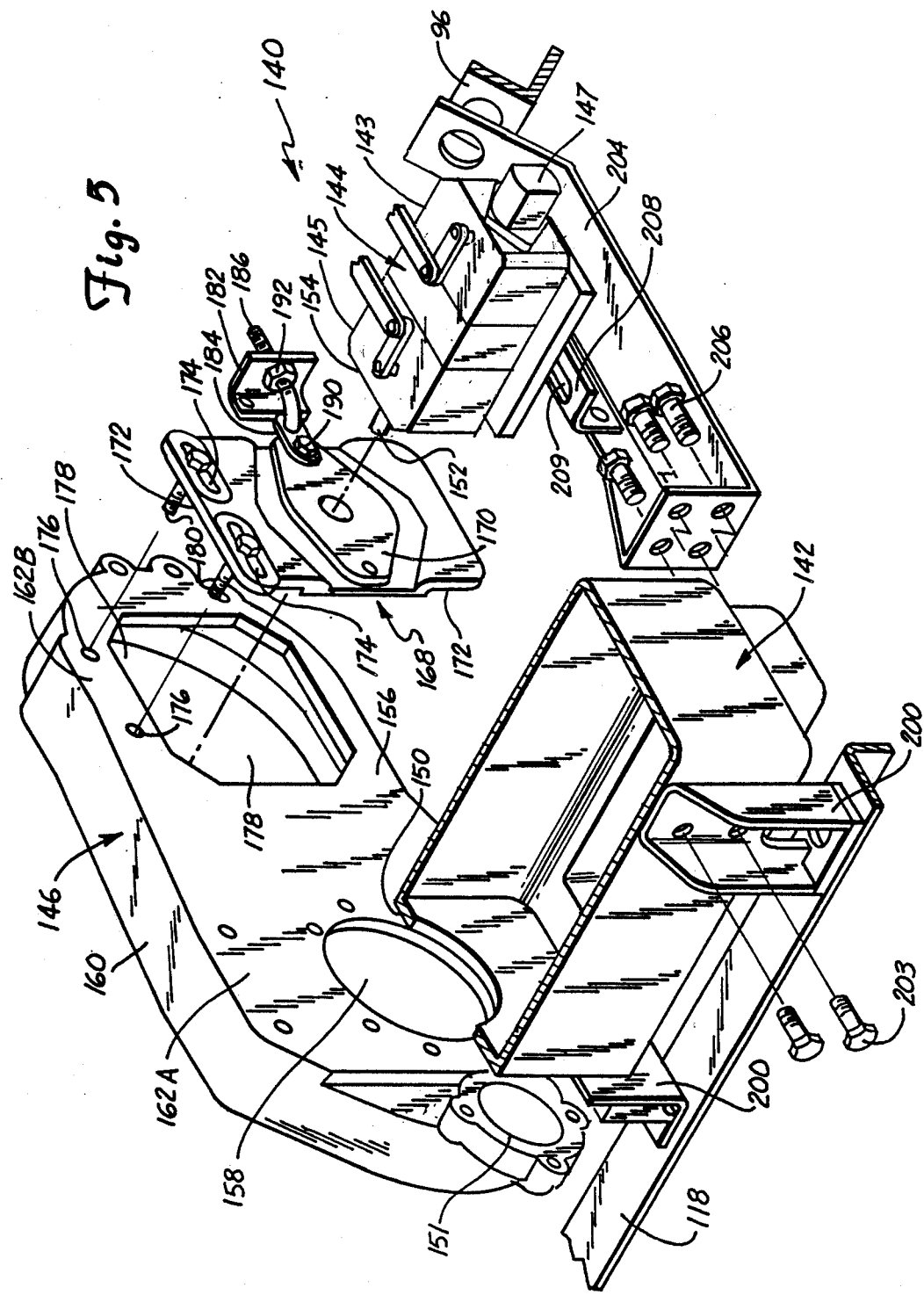
FIG. 5 is an exploded perspective view of an engine and pump assembly utilized in the vehicle shown in FIG. 1.
Figure 6:
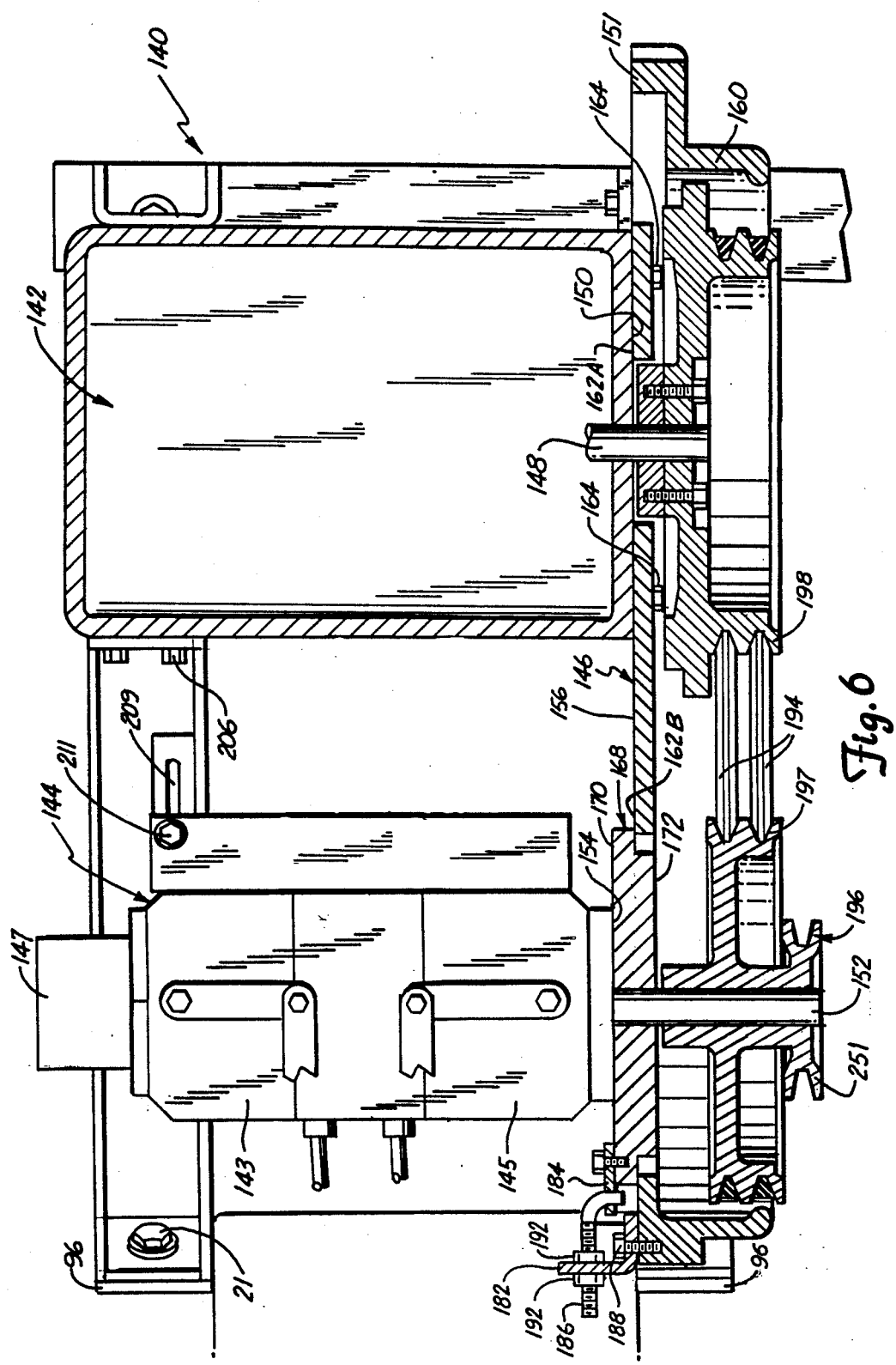
FIG. 6 is a top view of the engine and pump assembly shown in FIG. 5.

While lower frame assembly 60 is being fabricated and assembled in the manner described above, engine and hydraulic pump assembly 140, which is perhaps best shown in FIGS. 5 and 6, can be simultaneously assembled. Engine and pump assembly 140 includes an engine 142 (only the case of which is shown in section in FIGS. 5 and 6 for purposes of clarity), a hydraulic pump assembly 144, and an engine/pump mounting bracket 146. Engine 142 can be of any commercially available type suited to the application, and has a drive shaft 148 which extends from its flywheel end face 150. Hydraulic pump assembly 144 includes a pair of variable displacement pumps 143 and 145, and an implement pump 147, all of which are driven by a common drive shaft 152. Drive shaft 152 extends from front face 154 of pump assembly 144. Engine 142 and pump assembly 144 are manufactured and/or subsequently machined in such a manner that their respective flywheel end face 150 and front face 154 are planar, and perpendicular to their drive shafts 148 and 152.

Engine/pump mounting bracket 146 has a back face 156, a front face 158, and a guard rim 160 which extends in a generally perpendicular direction from the periphery of the front face. Mounting bracket 146 is manufactured and/or machined after manufacture so that an engine mounting portion 162A and a pump mounting portion 162B of back face 156 are planar and parallel to one another. Engine 142 is secured to mounting bracket 146 by bolts 164, with its flywheel end face 150 fit adjacent engine mounting portion 162A of back face 156. Since surfaces 150 and 156 are planar, and drive shaft 148 extends perpendicularly from engine flywheel end face 150, perpendicular alignment between shaft 148 and back face 156 of mounting bracket 146 is ensured. A drive pulley 198 is then mounted to the end of engine drive shaft 148.

Engine/pump mounting bracket 146 also includes a starter motor mount 151 fabricated integrally therewith on its periphery near engine mounting portion 162A. Starter motor 153 (FIG. 12) can be fastened directly to mount 151, and coupled to engine drive shaft 148 through a linkage (not shown) in a convention manner.

Pump assembly 144 is adjustably secured to mounting bracket 146 by means of adjustable mounting bracket 168. Bracket 168 is fabricated and/or subsequently machined in such a manner as to include a hydraulic pump assembly mounting face 170 on one side thereof, and a mutually parallel mounting bracket face 172 on the opposite side. A pair of horizontally oriented slots 174 extend through bracket 168 near its upper edge, and are positioned in such a manner as to be vertically aligned with bores 176 which extend through portion 162B of engine/pump mounting bracket 146. Adjustable mounting bracket 168 is sized to have a height greater than the height of aperture 178 in engine/pump mounting bracket 146. Upper and lower portions of mounting bracket face 172 will therefore extend beyond aperture 178 and fit against portion 162B of back face 156 of engine/pump mounting bracket 146.

Hydraulic pump assembly 144 is mounted to bracket 168 by fasteners (not shown), with its front face 154 flush with pump mounting face 170. Adjustable bracket 168, in turn, is mounted to engine/pump mounting bracket 146 by means of bolts 180 which extend through slots 174 and bores 176, and are secured by nuts (not shown). Mounting bracket face 172 of adjustable bracket 168 will be flush with surface portion 162B of engine/pump mounting bracket 146. Since pump shaft 152 is oriented perpendicular to front face 154, and front face 154, faces 170 and 172 of adjustable bracket 168, and pump mounting portion 162B of bracket 146 are all parallel to one another, pump shaft 152 will be parallel to engine shaft 148 when hydraulic pump assembly 144 and engine 142 are mounted to engine/pump mounting bracket 146 in the manner described. An integral pump and fan drive pulley unit 196 is mounted to the end of pump shaft 152. Pump pulley 197 of pump and fan drive pulley unit 196 is coupled by drive belts 194 to engine pulley 198 as shown. Unit 196 also includes a fan drive pulley 251.

The position of hydraulic pump assembly 144 on engine/pump mounting bracket 146 can be adjusted while at the same time maintaining shafts 152 and 148 in their mutually parallel state. This is accomplished by means of brackets 182 and 184, and adjustment rod 186. Bracket 182 is fastened to engine/pump mounting bracket 146 by means of bolts 188 (FIG. 6) and extends from the engine/pump mounting bracket toward hydraulic pump assembly 144. Bracket 184 is secured to adjustable bracket 168 by means of bolt 190. A semicircularly bent end of rod 186 extends through a bore in bracket 184 and is secured thereto, while a threaded end of rod 186 extends through a bore in bracket 182. When bolts 180 are loosened, adjustable bracket 168 and hydraulic pump assembly 144 can be moved horizontally toward or away from engine 142 by turning nuts 192 which are threaded onto rod 186 on opposite sides of bracket 182.

Additional support between engine 142 and pump assembly 144 is provided by brackets 204 and 208. One end of bracket 204 is fastened by bolts 206 to the side of engine 142 which faces pump assembly 144. Bracket 208 includes an elongated slot 209, and is fastened to bracket 204 with slot 209 opening toward pump assembly 144 and oriented parallel to surface 156 of engine/pump mounting bracket 146. Hydraulic pump 144 is then secured to bracket 208 by one or more bolts 211 which extend through slot 209.

Following the assembly of engine and hydraulic pump assembly 140 in the above-described manner, the position of hydraulic pump assembly 144 on engine/pump mounting bracket 146 can be adjusted to properly tension belts 194. Bolts 180 and 211 are loosened to permit movement of adjustable bracket 168 and pump assembly 144 with respect to engine/pump mounting bracket 146 and engine 142. Nuts 192 are then rotated to move pump assembly 144 toward or away from engine 142 until the proper tension is applied to belts 194. Pump assembly 144 is then securely fastened with respect to engine 142 by tightening bolts 180 and 211. In an alternative embodiment, a spring-loaded idler pulley (not shown) which is mounted to bracket 146 applies pressure to drive belts 194 at a location intermediate pump and fan drive pulley unit 196 and engine pulley 198, thereby properly tensioning the drive belts.

Figure 14:
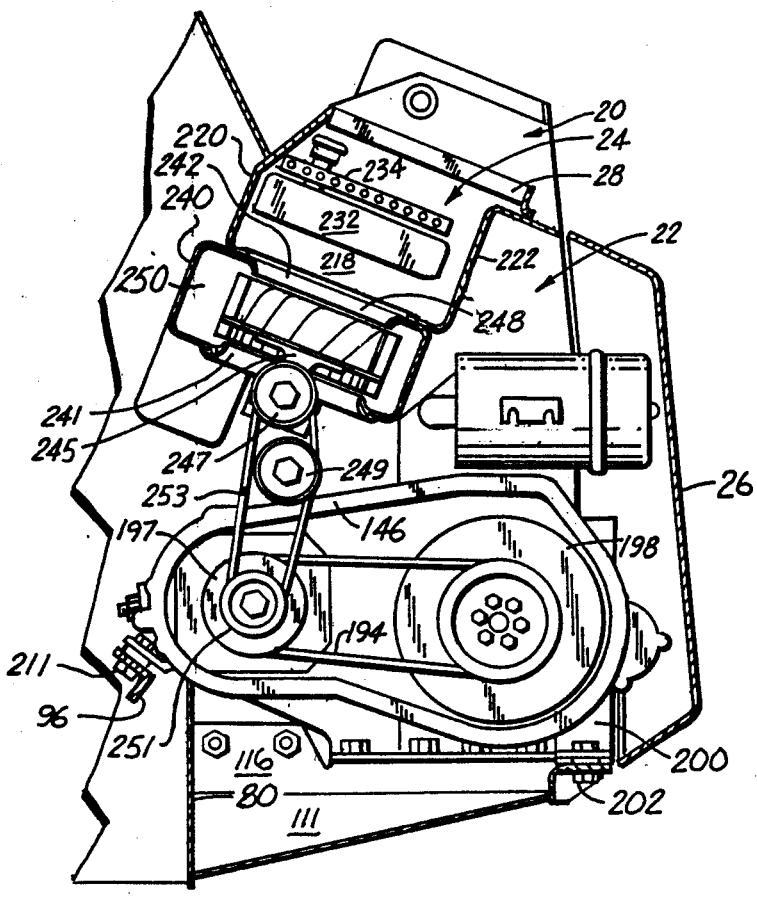
FIG. 14 is a side view of the rear of the loader with portions cut away to illustrate the engine and heat exchanger compartments of the vehicle.
Figure 7:
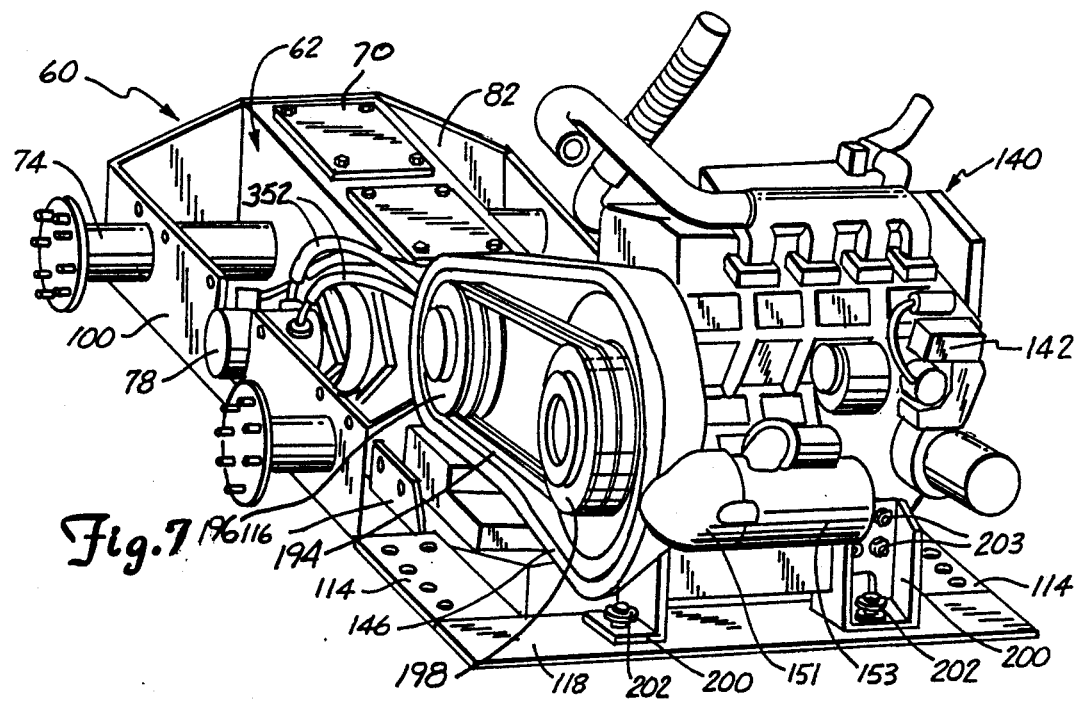
FIG. 7 is a perspective view, taken from the rear, of the lower frame assembly after the engine and pump assembly has been mounted thereon.
Figure 15:
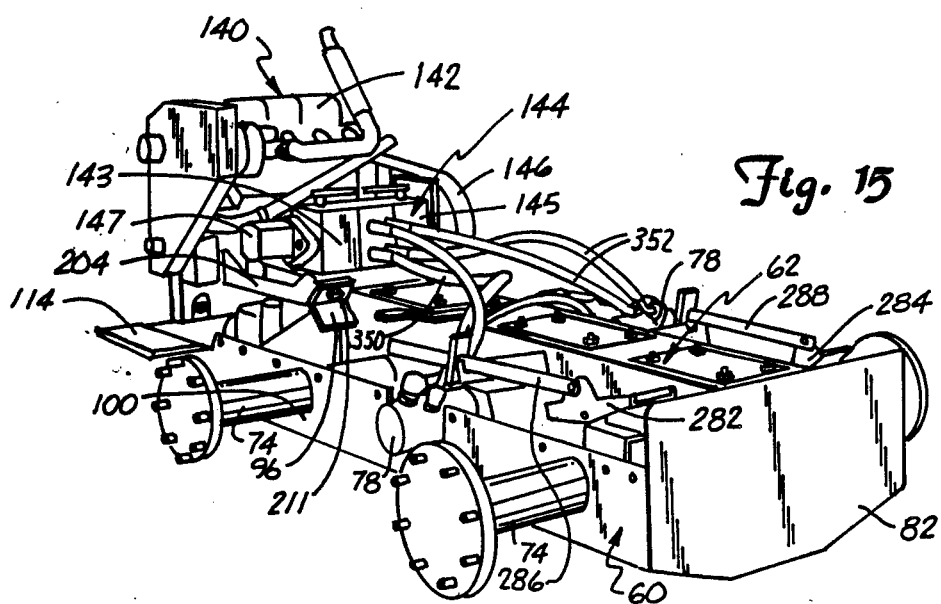
FIG. 15 is a perspective view, taken from the front, of the lower frame assembly after the engine and pump assembly has been mounted thereto.

After it has been assembled and trimmed in the manner described above, engine and hydraulic pump assembly 140 are mounted to engine mount assembly 110 at the rear of lower frame assembly 60, as shown in FIG. 7. Engine 142 is fastened to rear mounting bracket 118 of engine mount assembly 110 by means of brackets 200 and bolts 202 and 203. Engine/pump mounting bracket 146 and bracket 204 are secured to mounting brackets 96 of lower frame assembly 60 by bolts 211 (FIGS. 6, 14 and 15). A fuel tank (not shown) can be located between belly pan panels 111, 112 and engine 142.

From the above description it can be seen that engine/pump mounting bracket 146 permits engine 142 and pump assembly 144 to be assembled with respect to each other before engine and pump assembly 140 is mounted to lower frame 60. Tension on belts 194 can be easily adjusted while at the same time maintaining proper alignment of engine drive shaft 148 and pump drive shaft 152. Furthermore, all of these procedures can be performed before main frame 16 is mounted to lower frame 60, hindering access to these portions of loader 10. Maintenance procedures involving motor 142, pump assembly 144 and belts 194 are also facilitated.

After engine and pump assembly 110 has been mounted to lower frame 60, hydraulic hoses or lines 350 which provide hydraulic fluid from variable displacement pump 143 to hydraulic motor 78 on the right side of the loader 10 can be connected. Similarly, hydraulic lines 352 which supply fluid between variable displacement pump 145 and hydraulic motor 78 on the left side of loader 10 can be added. These assembly procedures are illustrated in FIG. 15. Boom control pedal 282 and bucket control pedal 284, as well as their respective linkages 286 and 288, can also be assembled on lower frame 60 at this time. All mechanical systems on lower frame assembly 60, including engine and pump assembly 140 and those within transmission case 62, can be fully tested and adjusted at this time without interference from main frame 16. These procedures increase manufacturing efficiency.

Figure 8:
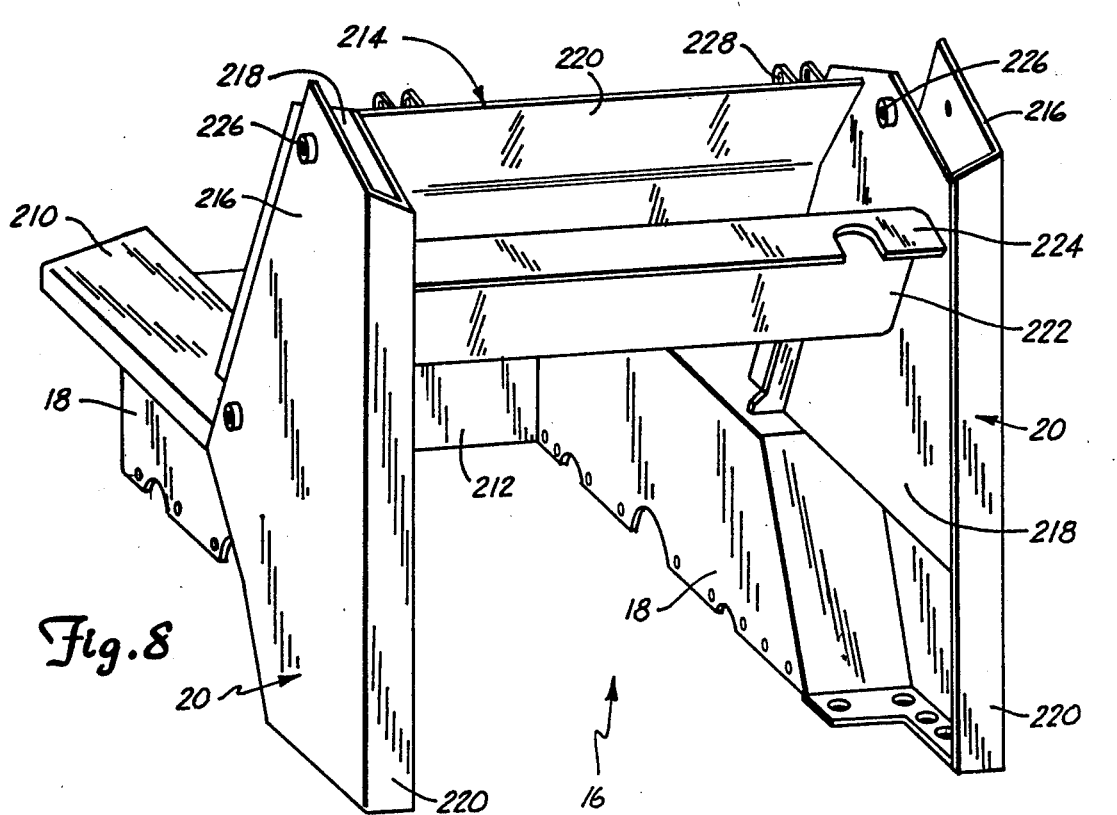
FIG. 8 is a perspective view of the main frame of the loader, taken from the rear side.

Main frame assembly 16 is illustrated in greater detail FIG. 8. Main frame assembly 16 is fabricated from steel and includes a pair of longitudinally extending and laterally spaced side beams 18 having outwardly directed upper flanges 210 which will overlie wheels 12 (FIGS. 1 and 2) and serve as protective fenders for loader 10. Side beams 18 are joined at the front by front cross or wall member 212, and at the rear by upright fabrication 214. The bottom side of main frame 16 is completely open.

Upright fabrication 214 includes a pair of upright members 20. Each upright member 20 includes a pair of laterally spaced side portions 216 and 218 joined by a vertically extending rear portion 220. Inner side portions 218 abut side beams 18, while side portions 216 are spaced outwardly from portions 218 to provide a channel therebetween. Each side portion 218 has an exhaust port 254 (FIGS. 1, 2 and 9) located near its forward edge. Mounting brackets 221 (only one is visible in FIG. 8) extend between lower edges of side portions 216 and side beams 18. Front cross member 220 extends between side portions 218 near the upper part of the front side of uprights 20. A generally vertically oriented rear cross member 222 and a generally horizontally oriented top cross member 224 extend between side portions 218 near the upper part of the rear of uprights 20. Boom pivot mounts 226 to which boom arms 32 of lift arm assembly 30 are pivotally connected are provided at the upper end of each upright 20. Cab pivot mounts 228 are located on the front side of front cross member 220. Main frame assembly 16 can be similar to that disclosed in the Bauer et al. U.S. Pat. No. 4,055,262, and is preferably fabricated from plates of steel which are welded together.

Figure 9:
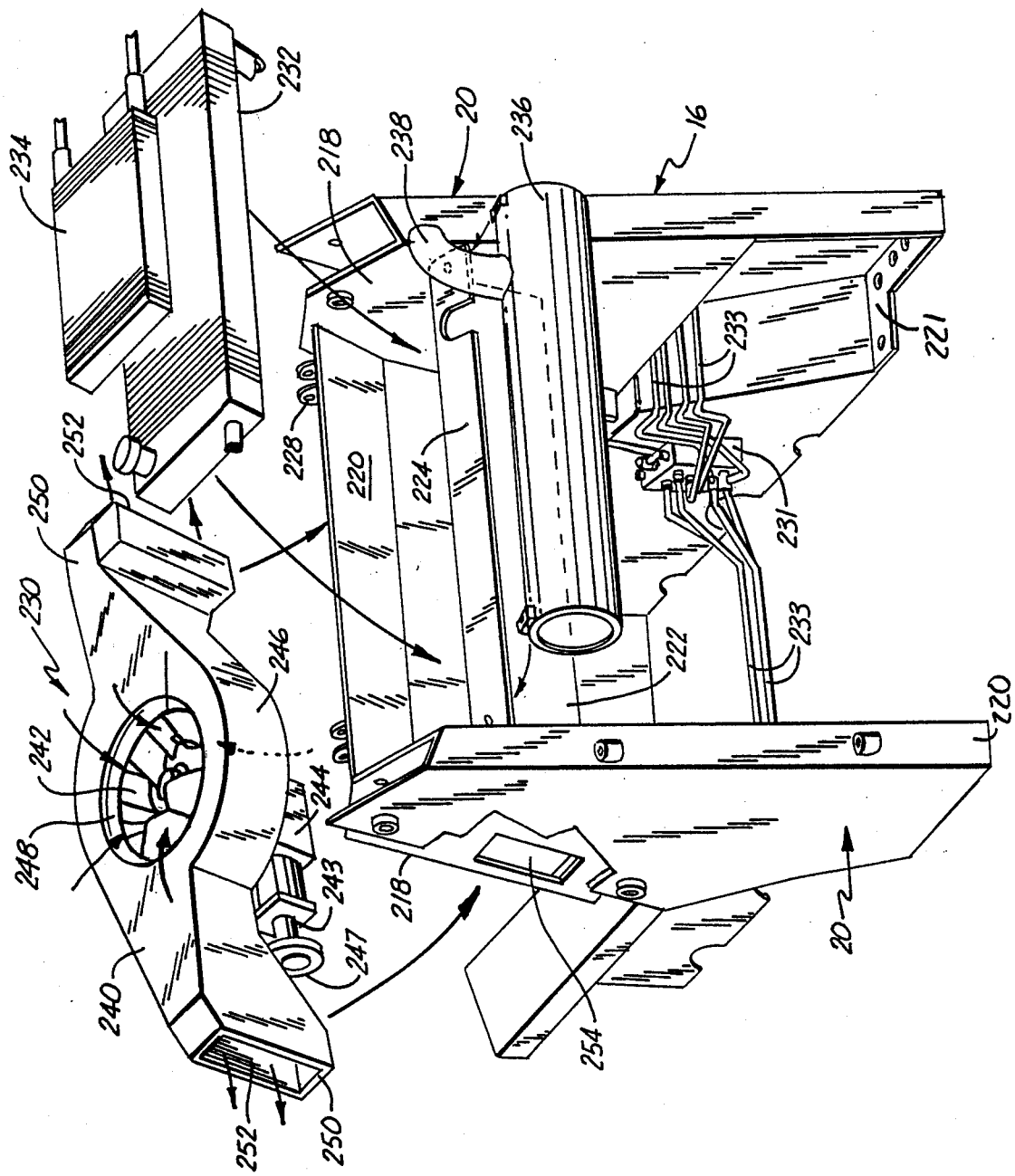
FIG. 9 is an exploded view of the main frame shown in FIG. 8, with the oil cooler, radiator, hydraulic control valve and fan assembly mounted thereto.

As shown in FIG. 9, a fan assembly 230, radiator 232, oil cooler 234, muffler 236 and hydraulic control valve 231 can be mounted (by means of fasteners not shown) to main frame assembly 16 after its fabrication and prior to its positioning on lower frame 60. Hydraulic fluid hoses 233 which couple control valve 231 to boom lift cylinders 36, pump assembly 144, the bucket tilt cylinder, and other auxiliary attachments (not shown) can also be easily positioned and secured to main frame 16 at this time. Radiator 232 and oil cooler 234 are mounted adjacent one another between front cross member 220 and rear cross member 222. This relationship, with radiator 232 positioned below oil cooler 234, can also be seen in FIGS. 13 and 14. Grill 28 (FIGS. 13 and 14), which includes a debris filtering screen (not separately shown), is mounted between uprights 20 and cross members 220 and 224 above oil cooler 234. Muffler 236 is mounted below top cross member 224 and to the rear of rear cross member 222. Exhaust pipe 238 extends from muffler 236 through an aperture in top cross member 224.

Fan assembly 230 includes a fan shroud 240, radial fan 242, and fan drive 244. Fan shroud 240 can be manufactured from plastic material, and includes a central portion 246 with a first or upper air intake aperture 248 in the top side thereof. A second or lower air intake aperture 241 (FIGS. 13 and 14) is located on the bottom side of fan shroud 240, opposite aperture 248. A pair of duct sections 250 communicate with and extend from opposite sides of central portion 246 of shroud 240. Each duct section 250 terminates in an exhaust port 252. As perhaps best shown in FIGS. 13 and 14, fan assembly 230 is mounted immediately below front cross member 220 and rear cross member 222. Fan shroud exhaust ports 252 communicate with exhaust ports 254 which open through members 218 of uprights 20.

Figure 10:
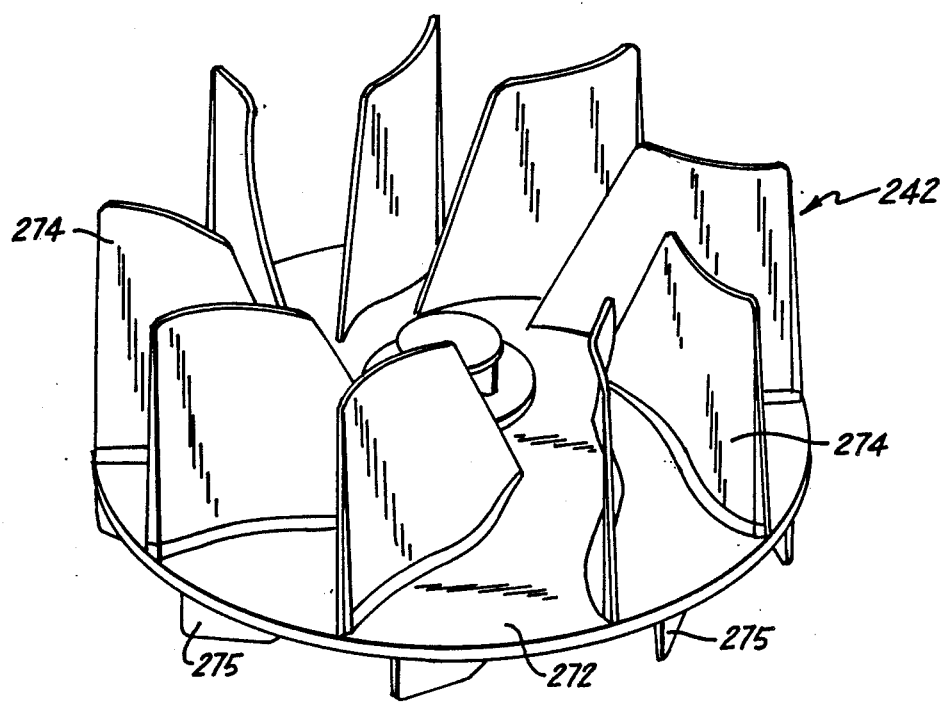
FIG. 10 is a detailed view of the fan shown in FIG. 9.
Figure 17:
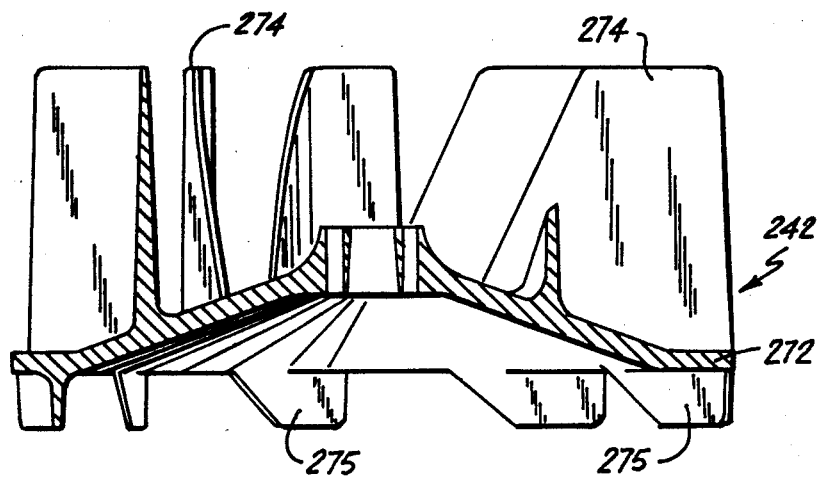
FIG. 17 is a cross sectional view of the fan shown in FIG. 10.

Radial fan 242 is mounted for rotation within central portion 246 of fan shroud 240, adjacent to and between air intake apertures 248 and 241. As is shown in greater detail in FIGS. 10 and 17, radial fan 242 is a double-bladed fan, having a concave base 272 with a first set of heat exchanger blades 274 extending from a first side thereof, and a second set of engine compartment blades 275 extending from a second side. As shown in FIG. 14, radial fan 242 is mounted within fan shroud 240 with heat exchanger blades 274 extending toward upper air intake aperture 148, and engine compartment blades 275 extending toward lower air intake aperture 241. For reasons described in subsequent portions of this specification, engine compartment blades 275 are smaller than heat exchanger blades 274. Blades 274 and 275 are contoured and positioned with respect to base 272 to optimize air flow requirements with power demands. Base 272 is concave so that the center of gravity of fan 242 is near the bearings of fan drive 244. Radial fan 242 is cast from a magnesium-aluminum alloy in one embodiment. Other materials can be used as well.

Referring again to FIGS. 9, 13 and 14, fan drive 244 is a right angle drive mechanism in the illustrated embodiment, and is mounted below central portion 246 of fan shroud 240. In other embodiments hydraulic or electric motor drives can be used. An output driveshaft 245 of fan drive 244 is connected to base 272 of radial fan 242. Fan drive 244 has an input drive shaft 243 which is coupled to hydraulic pump drive shaft 152 through pulleys 247, 249 and 251, and belt 253. Radial fan 242 will thereby be rotated within fan shroud 240 by engine 142. The tension on belt 253 is adjusted by means of idler pulley 249.

Figure 12:
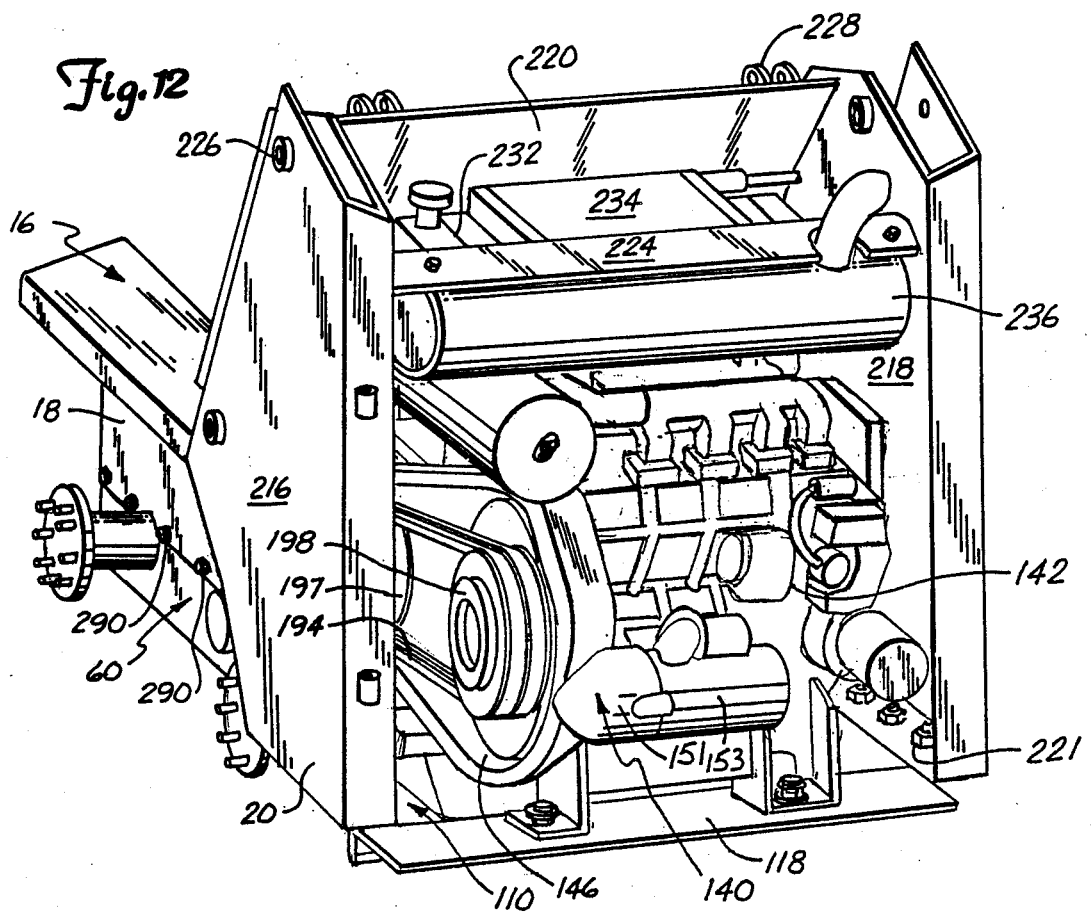
FIG. 12 is a perspective view of a partially assembled loader after the main frame has been mounted to the assembly shown in FIG. 7.

As illustrated in FIG. 12, main frame 16, to which fan assembly 230 (not visible in FIG. 12), oil cooler 234, radiator 232, muffler 236 and other mechanical and hydraulic components have been mounted, can next be dropped onto and fastened to lower frame assembly 60. This step is performed after engine and hydraulic pump assembly 140 has been mounted to lower frame assembly 60. Side beams 18 are fastened to side flanges 100 by bolts 290. Mounting brackets 221 of uprights 20 are secured to mounting flanges 114 of engine mount assembly 110, while more forward portions of uprights 20 are fastened to side flanges 116. Required interconnections between oil cooler 234, radiator 232, muffler 236, and engine 142 can then be easily and conveniently made.

The assembly of remaining structural elements of loader 10 can then continue in a known manner. Hydraulic fluid hoses 233, which have already been positioned on main frame 16, can be connected to pump assembly 144. Control linkages such as linkage 286 which couples foot control pedal 282 to hydraulic control valve 231 can be added. Front closure panels 283 which extend between side beams 18 below seat pan 52 are fastened in place. Door 26 is hingedly connected to one of uprights 20 at the rear of the vehicle. Cab 42 is pivotally connected to pivot mounts 228. Lift arm assembly 30 is pivotally mounted to uprights 20 at pivot mounts 226. Instrumentation and controls such as levers 58 within operator compartment 40 are also added, as are linkages 302 which couple these levers to variable displacement pumps 143 and 145.

It can be seen from FIG. 13 that engine compartment 22 has a rearward portion defined at its rear by door 26, at its bottom by panels 111 and 112 of engine mount assembly 110, at its sides by portions 218 of uprights 20, at its front by the back wall 50 of cab 42, and on its top by cross members 220 and 224 and the side and lower surfaces of fan shroud 240. A forward portion of engine compartment 22 opens into lower frame assembly 60 below cab 42. This forward portion of engine compartment 22 is defined by back panel 50 and seat pan 52 of cab 42, front closure panels 283, side beams 18 of main frame 16, and bottom panels 101 and transmission case 62 of lower frame assembly 60.

Heat exchanger compartment 24 is defined on its sides by portions 218 of uprights 20, at its rear by cross member 222, at its front by cross member 220, at the top by grill 28, and at its bottom by the top surface of fan shroud 240.

When loader 10 is being driven by an operator, radial fan 242 will be rotated at a high speed within fan shroud 240. Heat exchanger blades 274 will thereby draw fresh ambient air through the screen of grill 28, oil cooler 234 and radiator 232, and into fan shroud 240 through its upper aperture 248. This air, which will have been heated through the transfer of heat when passing through oil cooler 234 and radiator 232, is discharged from loader 10 through fan shroud ducts 250 and exhaust ports 254. Concurrently, engine compartment blades 275 of radial fan 242 will draw air and debris from within engine compartment 22. This air and debris will be mixed with the air drawn through heat exchanger compartment 24, and jointly discharged through exhaust ports 254. The mass of air drawn from engine compartment 22 will be relatively small (e.g. 600 CFM) compared to that drawn through grill 28 (e.g. 3600 CFM) since heat exchanger blades 274 are larger and configured to be more efficient than engine compartment blades 275.

The double inlet fan shroud system of loader 10 has significant advantages over prior art designs. Heated air and debris from within engine compartment 22 are evacuated without being passed through oil cooler 234 or radiator 232. Temperatures within operator's compartment 40 can then be maintained at a comfortable level. The relatively small mass of air drawn from engine compartment 22, with respect to that being drawn through heat exchanger compartment 24, also helps cool engine 142. Furthermore, by selecting proper fan speed and size of blades 275, the minimum air flow required to maintain a stable near ambient condition within engine compartment 22 can be selected. This minimizes the amount of dirt, dust and other debris carried into engine compartment 22 resulting in a more serviceable unit. The reduced temperatures within engine compartment 22 also results in a more favorable environment for heat sensitive components. Useable life of seals and other components can thereby be extended. Fresh and therefore relatively cool ambient air (as opposed to heated air from within the engine compartment) is drawn through heat exchanger compartment 24. The heat transfer efficiency of oil cooler 234 and radiator 232 are therefore better than if air from within the engine compartment were used. Since the ambient air drawn into heat exchanger compartment 24 is taken from the top of the vehicle and relatively high above the ground, it will have relatively little dust and debris which might otherwise clog the radiator and oil cooler. This fan system can also be efficiently manufactured.

Yet other advantages of the disclosed double inlet fan system reside in its flexibility. The use of engine/pump mounting bracket 146 along with the pulley and drive belt linkage permits different engines having various speed and power outputs to be easily coupled to one of a variety of different pumps having various displacements and speed. Fan size, blade configuration and fan speed can also be selected to minimize horsepower consumption and fan noise while maximizing the volumes of air being transmitted. Air flow through the heat exchanger compartment and from the engine compartment can also be independently selected through the configurations of fan blade sizes and aperture openings. Since a variety of different types of fan drives can be used, and speed ratios can be adjusted using different sized pulleys, fan characteristics can be suitably selected to optimize operating characteristics without being limited by engine, pump or vehicle speed. This high degree of flexibility is very important in that it permits a line of differently sized skid steer loader models to be efficiently produced.

Figure 11:
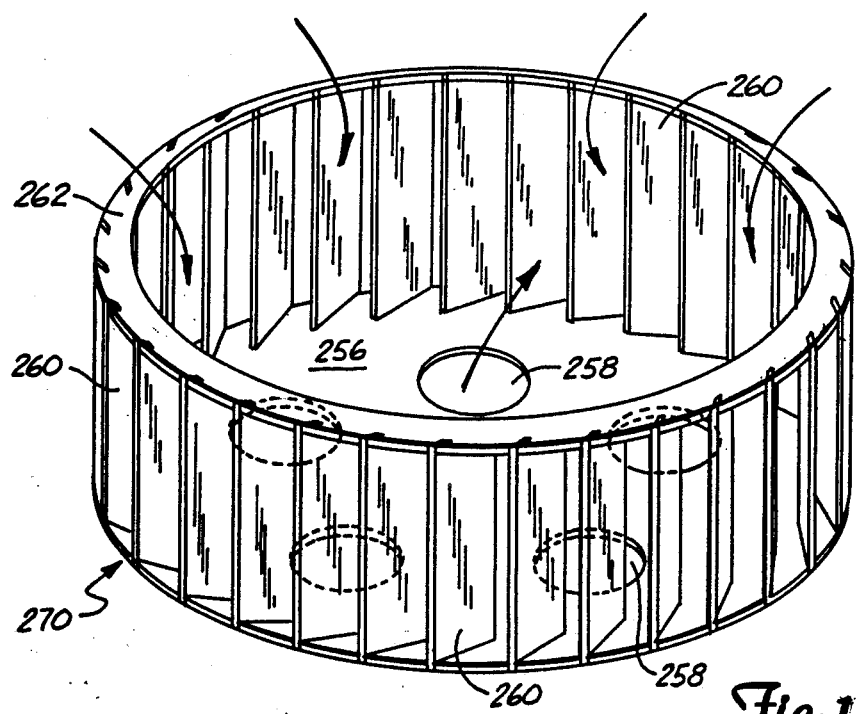
FIG. 11 shows an alternate embodiment of the fan.

An alternative radial fan 270 is illustrated in FIG. 11. Radial fan 270 includes a circular base 256 with a plurality (five are shown) of air intake apertures 258 which extend therethrough. Mounted to base 256 and extending perpendicularly therefrom are a plurality of fan blades 260. As shown, all fan blades 260 are mounted at the same angle with respect to radial axes of base 256. A ring 262 is fastened to the ends of fan blade 260 opposite base 256. In one embodiment, fan blades 260 are welded to plate 256 and ring 262. Fan 270 can be cast or molded from other materials as well.

Fan 270 can be mounted to output drive shaft 245 of fan drive 244 in place of radial fan 242 previously described. When loader 10 is being driven by an operator, radial fan 270 will rotate within fan shroud 240, and draw fresh ambient air through the screen of grill 28, oil cooler 234 and radiator 232, and into fan shroud 240 through its upper intake aperture 248. This air is then discharged from loader 10 through fan shroud ducts 250 and exhaust ports 254 in a manner identical to that previously described. Concurrently, air and debris from within engine compartment 22 will be drawn through apertures 258 of plate 256, mixed with the air drawn through heat exchanger compartment 24, and jointly discharged through exhaust ports 254. A mass of air drawn through engine compartment 22 can be selected by varying the size and quantity of apertures 258.

Although the present invention has been described with reference to preferred embodiments, workers skilled in the art will recognize that changes may be made in form and detail without departing from the spirit and scope of the invention.

What is claimed is:

1. A method for assembling a skid steer loader, including:
fabricating a lower frame assembly including a front end, and a back end having an integral engine mounting structure;
providing an engine;
fabricating a main frame assembly having laterally spaced side members adapted to be mounted to the engine mounting structure of the lower frame assembly and form side walls of an engine compartment;
mounting the engine to the engine mounting structure at the back end of the lower frame assembly; and
mounting the main frame assembly to the lower frame assembly after the engine has been mounted to the engine mounting structure at the back end of the lower frame assembly.

2. The method of claim 1 and further including:
providing a hydraulic pump; and
mounting the hydraulic pump to the engine mounting structure at the back end of the lower frame assembly before mounting the main frame assembly to the lower frame assembly.

3. The method of claim 2 and further including:
providing a linkage for coupling the hydraulic pump to the engine; and
coupling the hydraulic pump to the engine with the linkage before mounting the main frame assembly to the lower frame assembly.

4. The method of claim 2 wherein the steps of providing the engine, providing the hydraulic pump, and mounting the hydraulic pump and engine include:
providing an engine/pump mounting bracket having an engine mounting portion and a pump mounting portion;
mounting the engine to the engine/pump mounting bracket at the engine mounting portion;
mounting the hydraulic pump to the engine/pump mounting bracket at the pump mounting portion and thereby forming an engine and hydraulic pump assembly; and
mounting the engine and hydraulic pump assembly to the engine mounting structure at the back end of the lower frame assembly before mounting the main frame assembly to the lower frame assembly.

5. The method of claim 2 wherein fabricating the lower frame assembly includes:
fabricating a transmission case having front and back walls and a pair of side walls;
fabricating the engine mounting structure; and
mounting the engine mounting structure to the back wall of the transmission case before the engine and hydraulic pump are mounted to the engine mounting structure.

6. The method of claim 5 wherein mounting the engine mounting structure includes welding the engine mounting structure to the back wall of the transmission case.

7. The method of claim 2 and further including:
providing a pair of hydraulic motors;
providing hydraulic fluid hoses;
mounting the hydraulic motors to the lower frame assembly; and
coupling the hydraulic fluid hoses between the hydraulic pump and the hydraulic motors after the hydraulic pump and engine have been mounted to the engine mounting structure and before the main frame assembly is mounted to the lower frame assembly.

8. The method of claim 2 and further including:
providing a hydraulic control valve;
providing hydraulic fluid hoses;
mounting the hydraulic control valve to the main frame assembly before the main frame assembly is mounted to the lower frame assembly; and
coupling the hydraulic fluid hoses to the control valve and mounting the hoses to the main frame assembly before the main frame assembly is mounted to the lower frame assembly.

9. The method of claim 1 and further including:
providing a radiator; and
mounting the radiator to the main frame assembly before the main frame assembly is mounted to the lower frame assembly.

10. A method for assembling a skid steer loader including:
  fabricating a lower frame assembly including a transmission case having front and back ends and a pair of sides, and an engine mount platform extending from the back end of the transmission case;
  providing an engine;
  providing a hydraulic pump;
  fabricating a main frame assembly having a pair of laterally spaced side members adapted to be mounted to the lower frame assembly and form side walls of an engine compartment;
  mounting the engine and hydraulic pump to the engine mount platform at the back end of the lower frame assembly; and
  mounting the main frame assembly to the lower frame assembly after the engine and hydraulic pump have been mounted to the engine mount platform, the side members of the main frame assembly partially defining an engine compartment enclosing the engine and hydraulic pump.

11. The method for assembling the skid steer loader as in claim 10 and further including:
  providing two hydraulic motors;
  providing hydraulic fluid hoses;
  mounting the hydraulic motors to the sides of the lower frame assembly transmission case; and
  coupling the hydraulic fluid hoses between the hydraulic pump and the hydraulic motors after the hydraulic pump has been mounted to the engine mount platform and before the main frame assembly is mounted to the lower frame assembly.

12. The method for assembling the skid steer loader as in claim 10 wherein fabricating the lower frame assembly includes:
  fabricating the transmission case;
  fabricating the engine mount platform; and
  mounting the engine mount platform to the back end of the transmission case before the engine and hydraulic pump are mounted to the engine mount platform.

13. The method for assembling the skid steer loader as in claim 12 wherein mounting the engine mount platform includes welding the engine mount platform to the back end of the transmission case.

14. The method for assembling a skid steer loader as in claim 10 wherein providing the engine and hydraulic pump and mounting the engine and hydraulic pump to the engine mount platform includes:
  providing an engine/pump mounting bracket having an engine mounting portion and a pump mounting portion;
  mounting the engine to the engine mounting portion of the engine/pump mounting bracket;
  mounting the hydraulic pump to the pump mounting portion of the engine/pump mounting bracket, thereby forming an engine and hydraulic pump assembly; and
  mounting the engine and hydraulic pump assembly to the engine mount platform.

15. The method for assembling the skid steer loader as in claim 14 and further including:
  providing a linkage for coupling the hydraulic pump to the engine; and
  coupling the linkage between the engine and hydraulic pump before the engine and hydraulic pump assembly is mounted to the engine mount platform.

16. The method for assembling the skid steer loader as in claim 14 wherein providing the engine/pump mounting bracket includes fabricating a bracket comprising:
  a main bracket element having the engine mounting portion;
  a pump bracket element having the pump mounting portion; and
  adjustable fastening means for mounting the pump bracket element to the main bracket element while permitting relative movement therebetween.

17. The method for assembling the skid steer loader as in claim 10 and further including:
  providing a hydraulic control valve;
  providing hydraulic fluid hoses;
  mounting the hydraulic control valve to the main frame assembly before the main frame assembly is mounted to the lower frame assembly; and
  coupling the hydraulic fluid hoses to the control valve and mounting the hoses to the main frame assembly before the main frame assembly is mounted to the lower frame assembly.

18. The method for assembling the skid steer loader as in claim 10 wherein fabricating the lower frame assembly and mounting the main frame assembly to the lower frame assembly includes:
  fabricating a lower frame assembly including a transmission case having a pair of sides, a pair of axle housings mounted to and extending from each side, and a pair of side flanges, each side flange spaced from a side of the transmission case and mounted to the axle housings; and
  mounting the main frame assembly to the lower frame assembly by bolting the side members of the main frame assembly to the side flanges of the lower frame assembly.

* * * * *